United States Patent
Jenkins

(10) Patent No.: US 11,734,971 B1
(45) Date of Patent: Aug. 22, 2023

(54) FUEL PROTECTION SYSTEM AND METHOD

(71) Applicant: Jason Jenkins, Cape Coral, FL (US)

(72) Inventor: Jason Jenkins, Cape Coral, FL (US)

( * ) Notice: Subject to any disclaimer, the term of this patent is extended or adjusted under 35 U.S.C. 154(b) by 0 days.

(21) Appl. No.: 17/900,322

(22) Filed: Aug. 31, 2022

(51) Int. Cl.
*G07C 9/00* (2020.01)
*G08B 13/22* (2006.01)

(52) U.S. Cl.
CPC ......... *G07C 9/00182* (2013.01); *G08B 13/22* (2013.01); *G05B 2219/37371* (2013.01)

(58) Field of Classification Search
CPC ............... G07C 9/00182; G08B 13/22; G05B 2219/3731
See application file for complete search history.

(56) References Cited

U.S. PATENT DOCUMENTS

| 4,369,437 A * | 1/1983 | Thompson, Jr. | G08B 13/08 340/539.1 |
| 2010/0090855 A1 * | 4/2010 | Wolf | B67D 7/22 340/686.6 |
| 2015/0148942 A1 * | 5/2015 | DeWitt | G05B 15/02 700/231 |
| 2017/0365120 A1 * | 12/2017 | Fieglein | G08B 3/10 |
| 2018/0229997 A1 * | 8/2018 | Long | B67D 7/04 |

* cited by examiner

*Primary Examiner* — Nabil H Syed
(74) *Attorney, Agent, or Firm* — Robert J. Rapp

(57) ABSTRACT

The present disclosure is directed to systems and methods for controlling access to fuel repositories such as an underground gasoline storage tank located at a retail gas station. A method of the present disclosure may include sensing when a fuel access cover is removed from a pipe that leads to an underground fuel storage tank. Alternatively, or additionally, the method may include sensing when a fuel regulation device or an access panel of a fuel pump has been accessed. Systems consistent with the present disclosure may monitor both a set of fuel storage tanks access points and a set of fuel pump access points that control the flow of pumped fuel. Unauthorized access to fuel may result in an alarm being initiated. Such systems may also allow authorized individuals to access fuel storage tanks or metering devices of specific fuel pumps after providing authorization information to a computer.

20 Claims, 8 Drawing Sheets

FUEL PROTECTION SYSTEM AND METHOD

BACKGROUND OF THE INVENTION

Field of the Disclosure:

The present disclosure is generally directed to controlling access to fuel repositories. More specifically, the present disclosure is directed to preventing theft of fuel.

Description of the Related Art:

In recent months the theft of gasoline and diesel fuel has increased dramatically. One reason for this price increase is the fact that the average retail price of gasoline in the U.S. has risen from about $2.20 per gallon in Jan. 2021 to over $5.00 per gallon in June of 2022. A single incident of gasoline theft can result in the loss of hundreds of gallons of gasoline and the loss of thousands of dollars. What are needed are new systems and methods that mitigate the ability of thieves to steal fuel from gas stations.

SUMMARY

The present disclosure is directed to methods, non-transitory computer-readable storage media, and methods for controlling access to a fuel repository. A method consistent with the present disclosure may include the steps of such as receiving an indication that a sensor of the fuel access point has been tripped, identifying that access to the fuel access point is unauthorized, and initiating an alarm based on the identification that the access to the fuel access point is unauthorized.

A non-transitory computer readable storage medium may implement a method consistent with the present disclosure. In such instances a processor may execute instructions out of a memory to perform the steps of receiving an indication that a sensor of the fuel access point has been tripped, identifying that access to the fuel access point is unauthorized, and initiating an alarm based on the identification that the access to the fuel access point is unauthorized.

A system consistent with the present disclosure may include a sensor of a first fuel access point and a computer receives an indication that the sensor of the fuel access point has been tripped. This computer may also identify that access to the fuel access point is unauthorized and may initiate an alarm based on the identification that the access to the fuel access point is unauthorized.

DETAILED DESCRIPTION

The present disclosure is directed to systems and methods for controlling access to fuel repositories such as an underground gasoline or diesel storage tank or fuel pump located at a retail gas station A method of the present disclosure may include sensing when a fuel access cover is removed from a pipe that leads to an underground fuel storage tank. Alternatively, or additionally, the method may include sensing when a fuel regulation device or an access panel of a fuel pump has been accessed. Systems consistent with the present disclosure may monitor both a set of fuel storage tanks access points and a set of fuel pump access points that control the flow of pumped fuel. Unauthorized access to fuel may result in an alarm being initiated. Such systems may also allow authorized individuals to access fuel storage tanks or metering devices of specific fuel pumps after providing authorization information to a computer.

An apparatus of the present disclosure may include one or more sensors that sense a condition associated with a fuel tank or fuel pumping unit. Conventionally, underground fuel storage tanks at a gas station may be accessed by removing a lid that covers a cover of a pipe that leads to the underground fuel storage tank. One way that thieves may steal fuel is by removing a first cover that allows access to a second cover that covers a pipe that leads to an underground storage tank. Once these covers are removed, a hose may be placed into the pipe and be fed into the storage tank such that fuel may be syphoned or pumped out of the underground storage tank into a storage tank located in a vehicle.

Here the purpose of the first cover is to make a flush surface with a driveway such that a tire of a vehicle is supported when that tire rolls over the access pipe. This first cover is like yet smaller than a manhole cover as it serves to fill a hole with a relatively flat surface. The second cover acts as a cover that may seal the pipe from the outside environment. Thieves may park their vehicle directly over a fuel access pipe, remove the first cover, remove the second cover, feed a hose into an underground tank via the open pipe, and the pump liquid fuel out of the underground tank. In instances when the second cover is locked in place with a lock, thieves may simply cut the lock with a cutting tool before removing the second cover.

Figure 1:
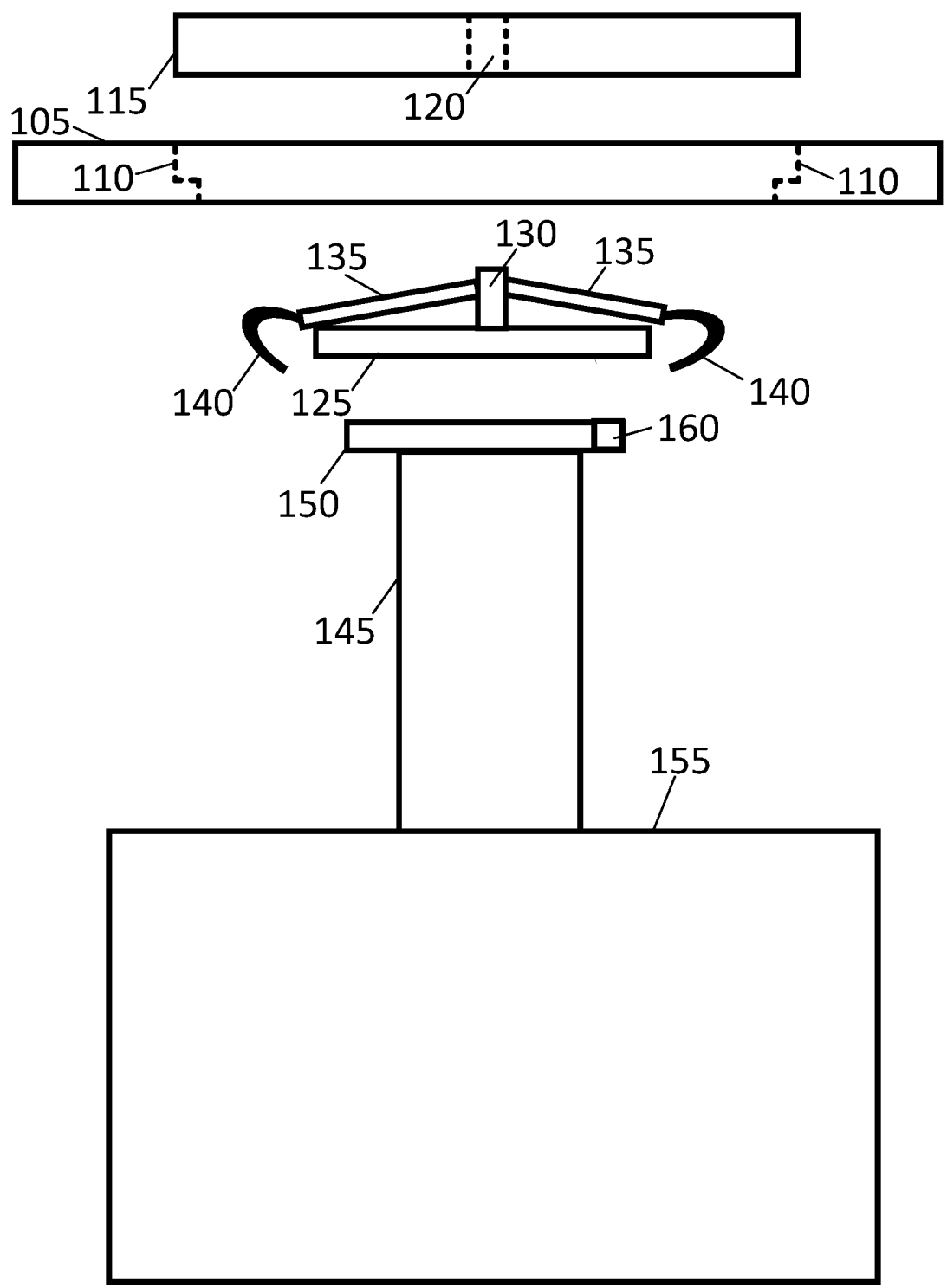
FIG. 1 illustrates a first cover that protects a pipe from wheels of vehicles that may drive over a driveway of a gas station.

FIG. 1 illustrates a first cover that protects a pipe from wheels of vehicles that may drive over a driveway of a gas station. FIG. 1 includes driving surface 105, a first cover 115, pipe 145, underground storage tank 155, and second cover 125. As discussed above, this first cover 115 when installed protects pipe 145 and cover 125 from being impacted by a tire of a vehicle because when installed, it forms a predominantly flat surface that is flush with the driveway 105.

The dashed lines 120 in cover 115 identify the location of a hole through 130 which a person may pass their finger and pickup cover 115. The dashed lines 110 illustrate areas in the driveway 105 that are designed to receive and hold the first cover 115 when it is placed above pipe 145 and second cover 125. The second cover 125 includes a mechanism that includes button 130, members 135, and hooks 140. When button 130 is depressed, caroming action associated with the movement of button 130, members 135, and hooks 140 may force hooks 140 to open such that the second cover 125 may be removed from a top surface flange 150 of pipe 145. In certain instances, button 130 may be spring loaded such that hooks 140 are forced back into a closed position when force is removed from button 130. Note that when the first cover 115 and the second cover 125 are removed, fuel tank 155 may be easily accessed via pipe 145.

Item 160 may be a sensor and or other electronics that can be used to detect when the second cover 125 is removed from or placed on pipe flange 150. Sensor 160 may include or be coupled to additional circuitry that is configured to send a signal to a monitoring computer via a wireless or wired interconnect. In certain instances, a wireless signal may be sent via repeaters located near an access point. Such repeaters may be positioned to guarantee that thieves could not contain a wireless signal within a Faraday cage, thereby, preventing the wireless signal from being received by a receiver. As such, repeaters place in strategic positions could help guarantee that thieves could not simply contain a wireless signal. These repeaters could receive a wireless signal and rout that signal through a wire to a monitoring computer.

Figure 2:
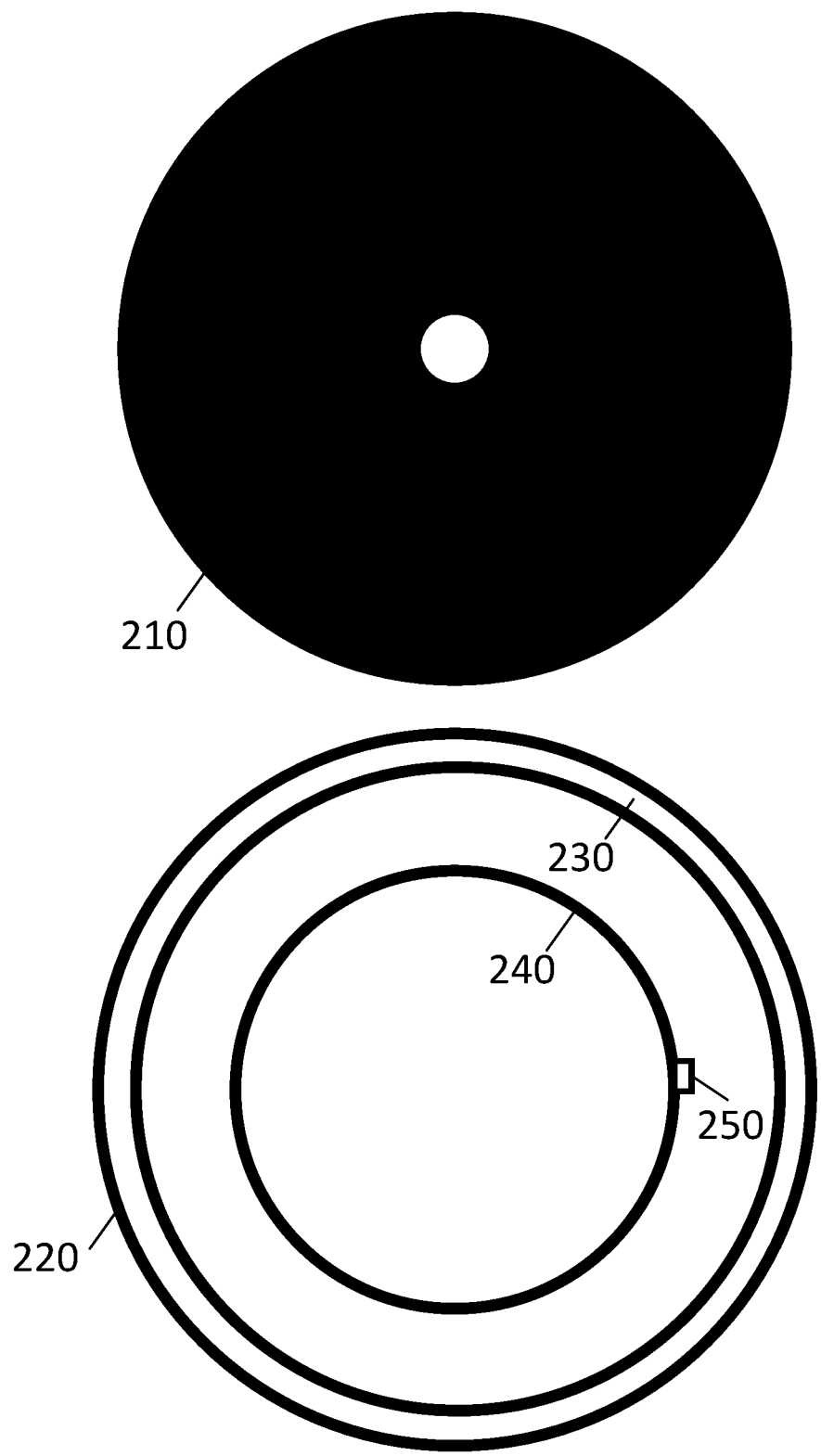
FIG. 2 illustrates a pipe cover and a hole that exposes a pipe that leads to an underground storage tank.

FIG. 2 illustrates a pipe cover and a hole that exposes a pipe that leads to an underground storage tank. FIG. 2 pipe cover 210 that has a finger hole (not numbered) that may be used to remove hole cover 210 from hole 220. FIG. 2 also includes a surface 230 upon which pipe cover 210 is supported when hole cover 210 is placed in hole 220. Item 240 is a pipe that leads to an underground storage tank and item 250 may be sensor and possibly other electronics that may be used to sense whether pipe cover (such as the second cover 125 of FIG. 1) is currently placed on pipe 240. As discussed above in respect to the first cover 115 of FIG. 1, hole cover 210 when installed may form a flush surface with a driveway built above an underground fuel tank.

Figure 3:
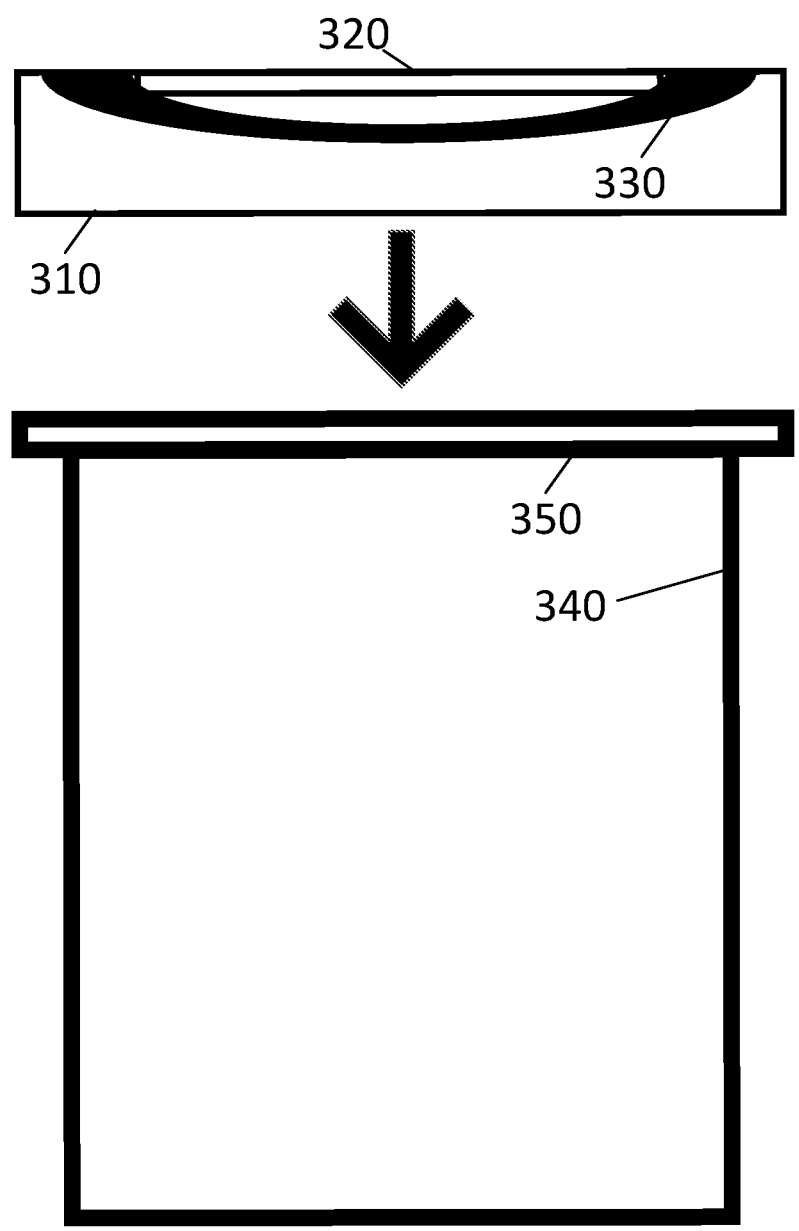
FIG. 3 illustrates a pipe cover that includes a set of electronics that may be installed over a pipe that leads to an underground fuel storage tank.

FIG. 3 illustrates a pipe cover that includes a set of electronics that may be installed over a pipe that leads to an underground fuel storage tank. FIG. 3 includes pipe cover 310 that may be used to cover or seal pipe 340. Pipe cover 310 includes electronic assembly 320 and seal 330. FIG. 3 also shows that pipe 340 includes flange 350 that may act as a surface to which a coupling mechanism may attach to such that pipe cover 310 is retained on pipe 340.

Electronic assembly 320 may include one or more sensors that sends whether pipe cover 310 is installed on pipe 340. Such sensors may be any sensors known in the art, including yet not limited to magnetic sensors, contact sensors, ultrasonic sensors, or optical sensors. Electronic assembly 320 may also include a wireless transmitter that transmits signals to other electronic devices. These other electronic devices may be sent an indication that identifies that pipe cover 310 is not installed on pipe 340. Seal 330 may seal electronic assembly 320 to isolate electronic assembly 320 from vapors that may be present in pipe 340.

Another way that fuel may be stolen from a retail gas station is by taking control of a "pulser" device in a fuel distribution system. Such pulser devices typically provide pulses that should correspond to a flow rate of fuel being pumped into a fuel tank of a vehicle. Such pulser devices are commonly located within a gas station pump. In certain instances, these pulser devices include or are coupled to a mechanism that rotates to generate pulses whose frequency corresponds to a fuel flow rate. These pules allow electronics at the pump identify a volume of fuel that has been pumped based on fuel flow rates and pumping times. By simply changing the pulse rate, pump electronics may be fooled allowing a thief to receive, for example, 100 gallons of fuel, when the pump electronics ascertains that only 10 gallons of fuel has been pumped.

For a thief to steal fuel by tampering with a pulser device of a fuel pump, that thief typically opens a closed cabinet and removes at least a portion of the pulser device from an inside surface of the cabinet. The thief may then connect an apparatus that changes a number of pulses that the pulser device provides for given flow rates. In certain instances, such an apparatus may include a rotating member coupled to the pulser device such that the pulser device produces fewer pulses for volume of fuel pumped. Apparatus consistent with the present disclosure may include one or more sensors that sense when a sealed cabinet is opened or when a pulser device is tampered with (e.g. removed from a mounting surface).

Figure 4:
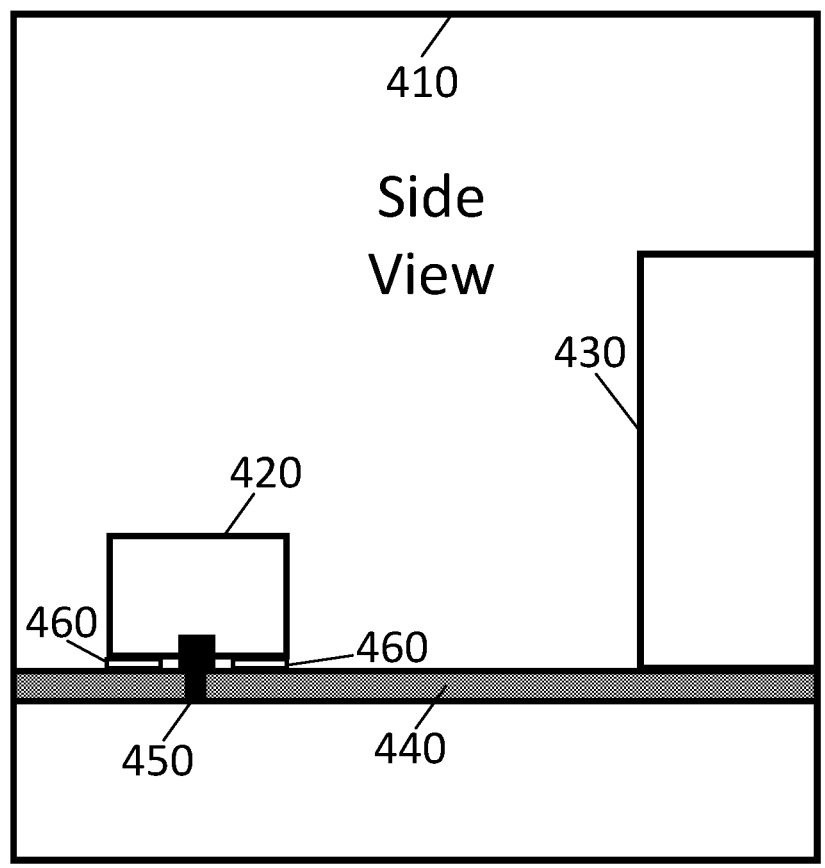
FIG. 4 illustrates components that may be included in a fuel control pumping cabinet of a retail fuel station.
Figure 4:
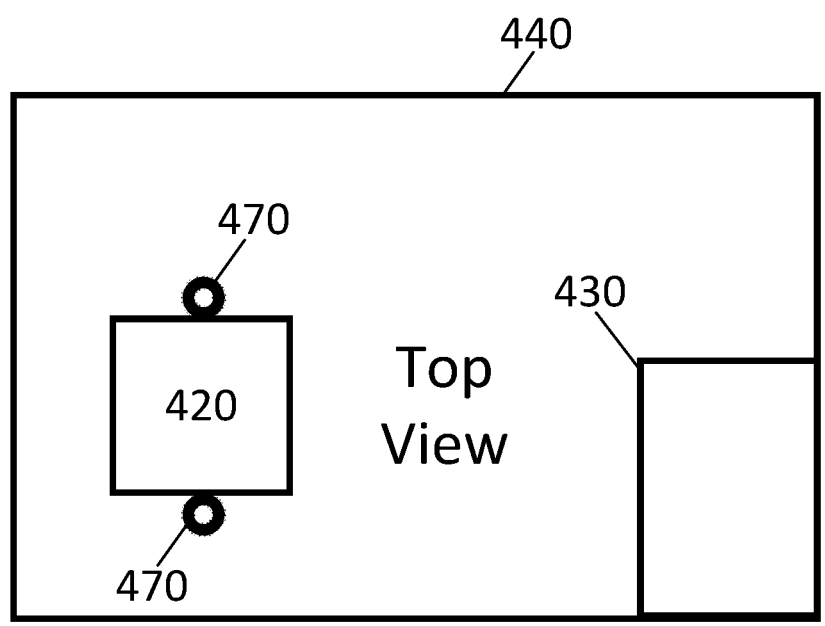

FIG. 4 illustrates components that may be included in a fuel control pumping cabinet of a retail fuel station. FIG. 4 includes cabinet 410, electronic assembly 430, pulser device 420, sensor 460, and sheet metal assembly 440. FIG. 4 includes a side view of parts included in cabinet 410 and a top view of components. Note that the side view includes sheet metal screws 450 that may fit through holes of pulser device mounting member flanges 470 illustrated in the top view of sheet metal assembly 440. Electronic assembly 430 may include electronics coupled to pulser device 440, to payment electronics, or other electronic sub-assemblies of a gas pump.

Sensor 460 may include or be coupled to electronics that communicate with computers of a security system. Here again a computer network (e.g. a wired or wireless network) may be used to receive signals from sensors/electronics 460 when screws 450 are removed.

Figure 5:
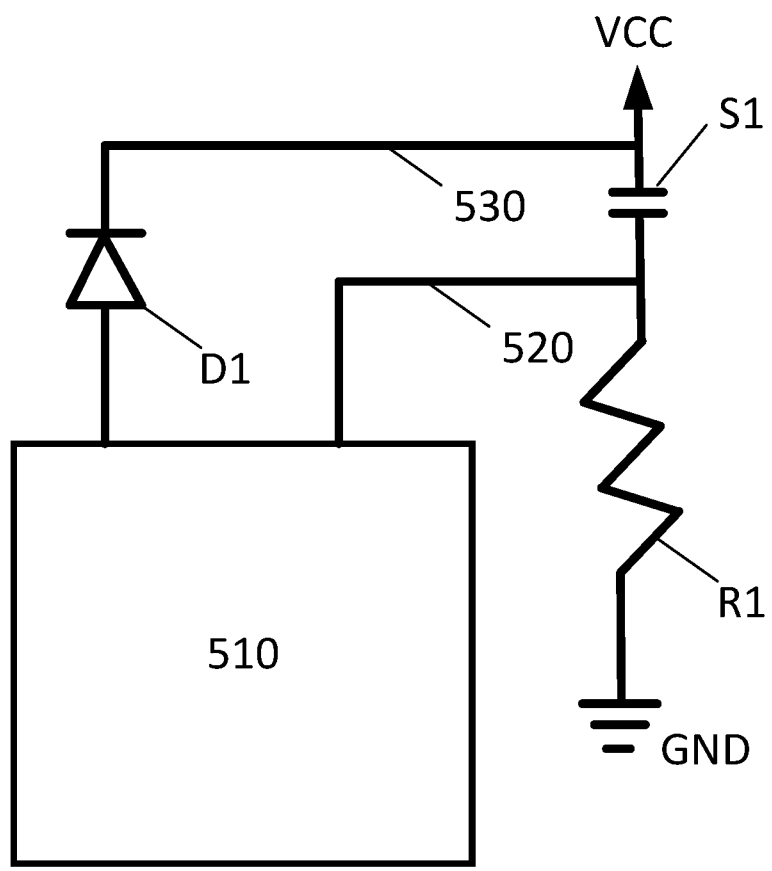
FIG. 5 illustrates a set of electronics that may be used to detect when electronics or a pulser device is removed from a mounting surface.

FIG. 5 illustrates a set of electronics that may be used to detect when electronics or a pulser device is removed from a mounting surface. FIG. 5 includes sensor S1, resistor R1, and electronics 510 that may be coupled to a voltage source VCC. Sensor S1 may be a compression sensor that connects a first contact of the sensor with a second contact of the sensor when the sensor is compressed between a device (e.g. a set of electronics or a pulser device and a mounting surface. FIG. 5 includes sense input 520 and voltage input 530 that may be provided to electronics 510. When sensor S1 is in a compressed state, a voltage received by sense input 520 will be at a voltage equal to voltage of item VCC of FIG. 5 because contacts of an upper part of sensor S1 and a lower part of sensor S1 will be electrically connected to each other. When sensor S1 is not compressed, a voltage provided to sense input 520 will be at ground potential of ground connection GND because resistor R1 is coupled to both ground GND and sense input 520. In this instance, a non-compressed state of switch S1 corresponds to a tripped state of sensor S1 that indicates that someone likely has tampered with the fuel pump. The compressed state of S1, in this instance, corresponds to a non-tripped state of sensor S1.

Note that diode D1 is coupled to voltage VCC and to electronics 510. Electronics 510 may include a battery or a capacitor (e.g. a supercapacitor) that is charged from voltage VCC based on current that flow through diode D1. in an instance when a voltage input VCC is removed, for example by a thief, electronics 510 may still be powered by this battery or capacitor. This means that removal of power from voltage VCC would result in sense input 520 being at a ground potential based on resistor R1 being coupled to ground GND while electronics 510 continues to being maintained operational by the battery or supercapacitor included in or coupled to electronics 510.

Figure 6:
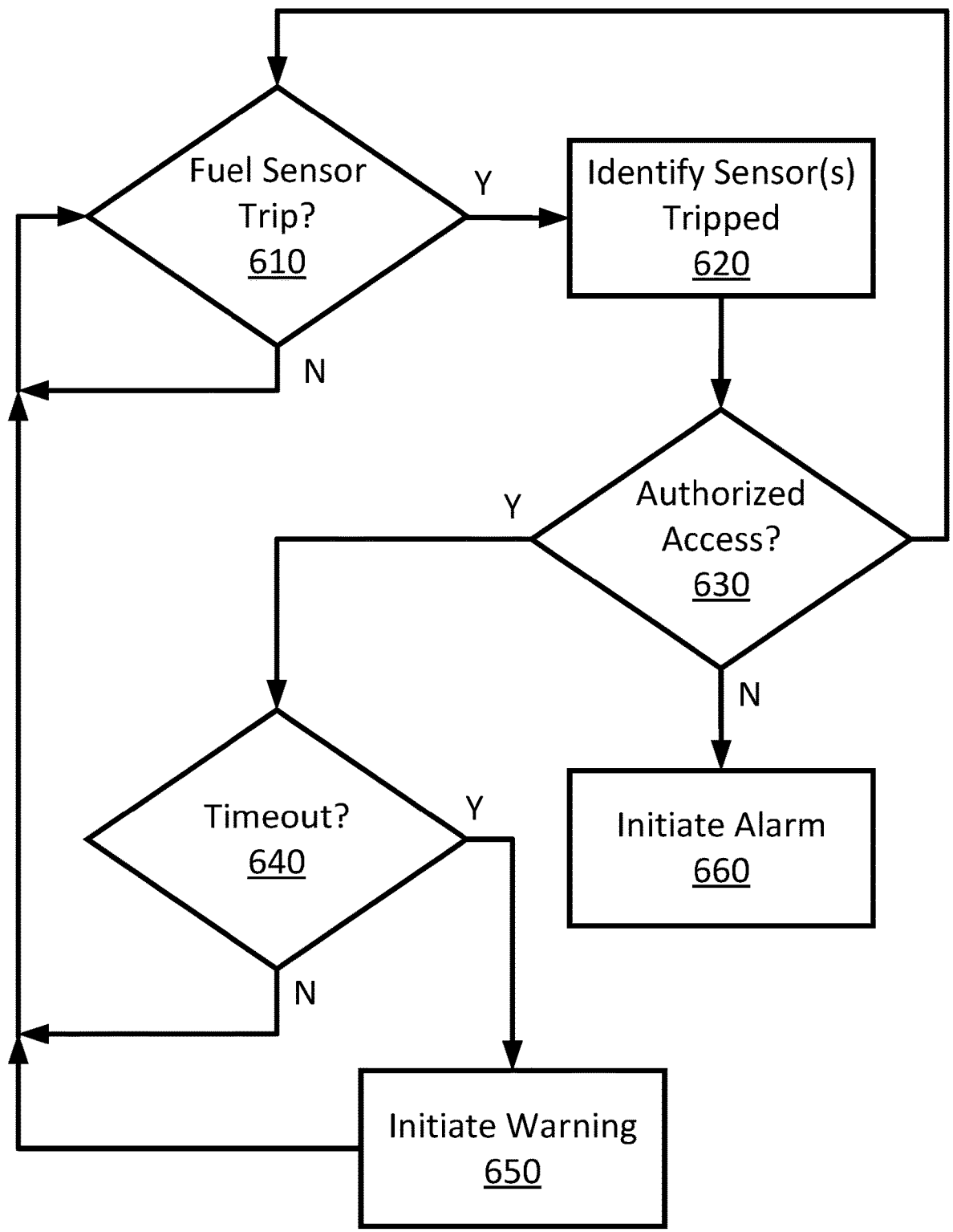
FIG. 6 illustrates a series of steps that may be performed by a computer that monitors and controls access to a fuel repository or fuel pumping system of a fuel station.

FIG. 6 illustrates a series of steps that may be performed by a computer that monitors and controls access to a fuel repository or fuel pumping system of a fuel station. FIG. 6 begins with determination step 610 where a determination is made as to whether a fuel sensor has been tripped. Determination step 610 may be performed by a computer that receives information from sensors at a fuel tank and at fuel pumps that are located at a retail gasoline station. A signal may be sent to a monitoring computer when a fuel tank is opened or when a fuel pump sensor has been removed from a mounting surface. When no sensor has been tripped or is currently in an active or tripped state, program flow may move back to step 610. When determination step identifies that a fuel sensor has been tripped, program flow may move to step 620 where sensors that have been tripped may be identified. This may include identifying that a single sensor or that multiple sensors have been tripped.

Program flow may then move to step 630 that identifies whether access to the tripped sensor(s) has been authorized. When access has not been authorized program flow may move to step 660 where an alarm is initiated. Determination step 630 may include cross-referencing the specific sensors identified in step 620 with authorization data in order to determine whether each of the identified sensors is associated with an authorized access. By checking the authorization status of each tripped sensor, the monitoring system can check whether each and every tripped sensor is associated with an authorized access. In instance when access to a fuel tank has been authorized during a fuel delivery and thieves attempt to access a fuel pump pulsing or metering device, an alarm could be issued based on detecting that the fuel pump pulsing or metering device has been accessed. When determination step 630 identifies that the access is not authorized, program flow could move to step 660 where the alarm is initiated.

When determination step 630 identifies that the access is authorized, program flow may move to step 640 that determines whether a timeout associated with the access has occurred. When a timeout has occurred, program flow may move to step 650 where a warning is initiated. Such a warning may send a message to an operator of the fuel station to inform the operator of the warning condition. After step 650, program flow may move back to step 610. In instances when a warning is not resolved, an alarm may be initiated. When determination step 640 identifies that the timeout has not occurred, program flow may move back to determination step 610.

Computers that monitor access to fuel tanks may allow authorized operators to open a fuel tank such that fuel can be delivered to fuel tanks from a tanker truck. A driver of a fuel delivery truck or other user may go through an authorization process that allows the driver to deliver fuel to tanks of a fuel station after that driver provides a set of authorization information to a fuel station monitoring computer during an interlock process. This may include requiring that a user or driver enter an office of the fuel station and log into the monitoring computer during the interlock process. Such a user may have an electronic or magnetic card that allows the user to temporarily disable an alarm system or specific parts of an alarm system at the fuel station. Depending on a given circumstance, users may be allowed to disable alarms associated with preventing tampering with a fuel tank cover or may be allowed to disable alarms located at a fuel pump.

Figure 7:
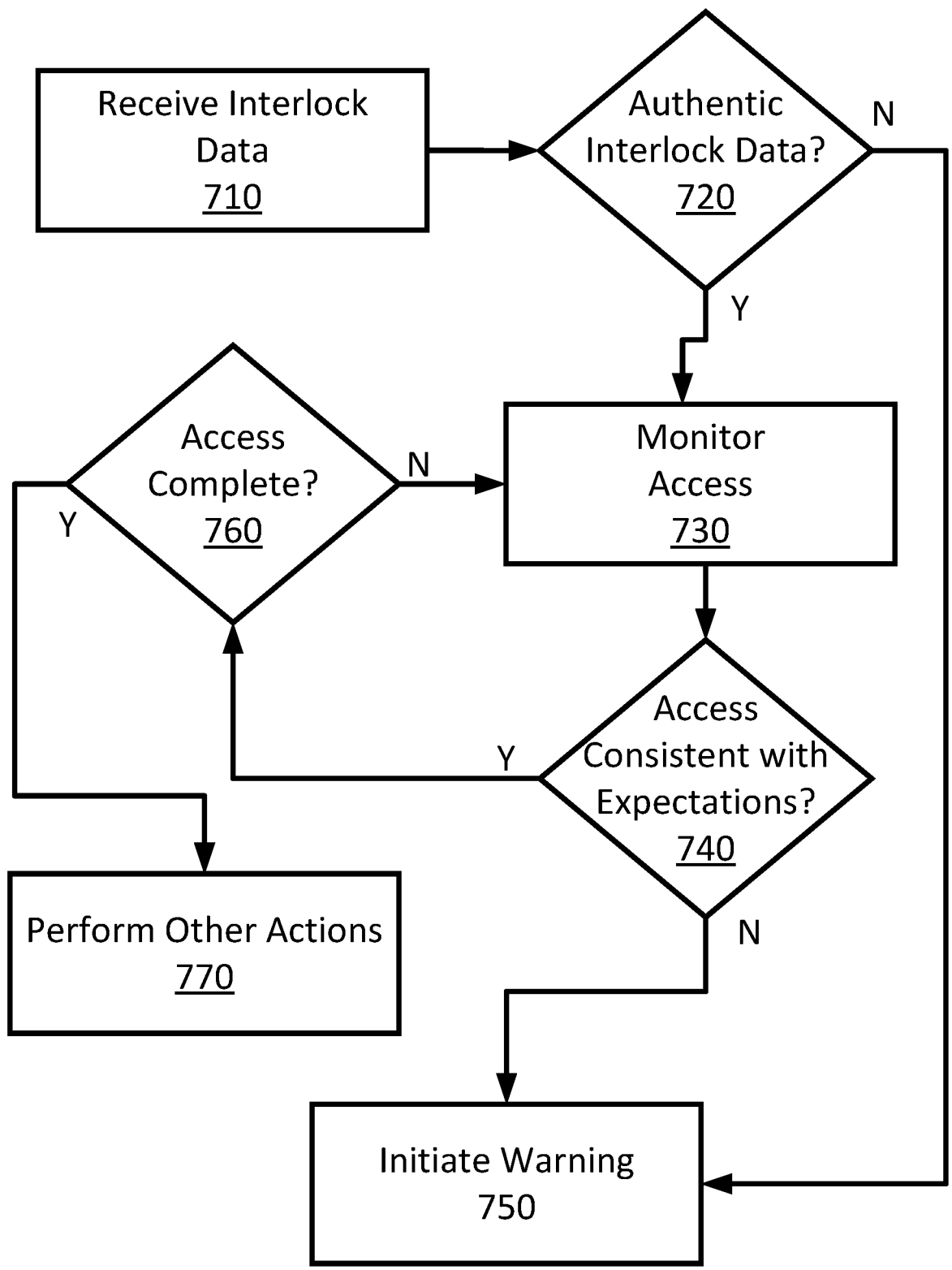
FIG. 7 illustrates steps that may be performed by a monitoring computer of the present disclosure.

FIG. 7 illustrates steps that may be performed by a monitoring computer of the present disclosure. FIG. 7 begins with step 710 where interlock data is received. This may include a user logging into the monitoring computer and may require that a user provide some form of physical identification, such as an authorization card, or human biometric. Program flow may then move to determination step 720 that identifies whether the interlock data provided is authentic, when no program flow may move to step 750 where a warning or alarm is initiated.

When determination step 720 identifies that the interlock data is authentic, program flow may move to step 730 where access to particular fuel tanks or fuel pumps is monitored. Program flow may then move 740 that identifies whether the access to the fuel tanks or fuel pumps is consistent with expectations. When no, program flow may move to step 750 where a warning or alarm is initiated. Here again a warning may be sent when a sensor has been in a tripped state for an amount of time that exceeds a timeout. When determination step 740 identifies that the access is consistent with expectations program flow may move to determination step 760 that identifies whether the authorized access is complete. Determination step 760 may require that sensors associated with an authorized access are currently in an un-tripped state and may potentially require that a user complete a logout procedure before identifying that an access has been completed. When an access is not complete, program flow may move back to step 730 where the monitoring of the access to the fuel tank or fuel pump is continued. When determination step 760 identifies that the access is complete, other actions may be performed in step 770. For example, after step 710, the monitoring computer may perform the steps of FIG. 6.

While methods of the present disclosure may allow users to control the alarm system using wireless communications, at least some control functions may require that the user physically access the monitoring computer within a secured area, such as an office of a fuel station. Such a physical access requirement provides greater security and also allows management to view video recordings of the secured area at times when a user accessed the monitoring computer. This may be because timing of user logins may be recorded by the monitoring computer. Timing of security video may also be synchronized with timing of the monitoring computer.

Figure 8:
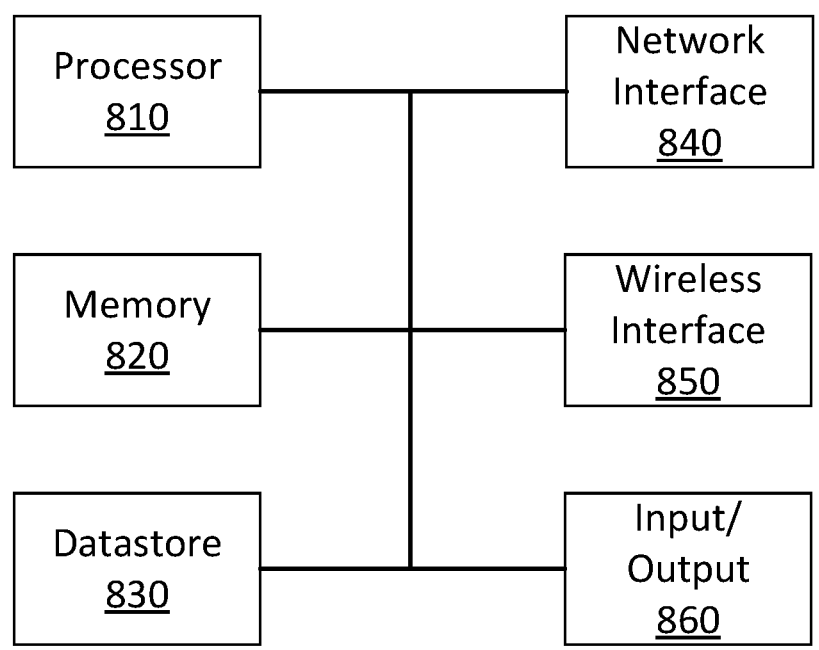
FIG. 8 illustrates a computing system that may be used to implement an embodiment of the present disclosure.

FIG. 8 illustrates a computing system that may be used to implement an embodiment of the present disclosure. FIG. 8 includes processor 810 that may execute instructions out of memory 820. FIG. 8 also include mass data store 830, network interface 840, wireless communication interface 850, and input/outputs (I/O) 860. Processor 810 may execute instructions out of memory 820. Communications may be sent via communication interface 840 or via I/O 860 to other computing devices. Inputs/outputs 860 may be coupled to one or more sensors that provide sensor data to the processor 810.

The computing device of FIG. 8 may be a device such as a desktop computer, notebook computer, tablet, a micro-chip module, or cell phone computing device A network interface or wireless communication interface may communicate with a remote computing device. Computing devices consistent with the present disclosure may also include a display that displays a user interface that allows users to set levels of trust and intimacy. This display may also be used to prepare messages to send or to display received messages. Wired network connections may include any standard wired network known in the art (Ethernet for example). Wireless communications may include communication signals consistent with cell phones, with 802.11 Wi-Fi, Bluetooth, radio, cellular, or other wireless communication mediums.

What is claimed is:

1. A method for controlling access to fuel, the method comprising:
    receiving a first indication that a sensor of a first fuel access point has been tripped, wherein the sensor of the first fuel access point monitors a cover that attaches to and seals a pipe;
    identifying that access to the first fuel access point is unauthorized;
    initiating an alarm based on the identification that the access to the first fuel access point is unauthorized;
    receiving authorization information associated with accessing the first fuel access point via the cover that attached to and that seals the pipe;
    setting a timeout period associated with the sensor based on the authorization information being consistent with an authorization process that allows access to the first fuel access point;
    receiving a second indication that the sensor of the first fuel access point has been tripped a second time; and
    identifying that the second tripping of the sensor is consistent with the authorization process that allows access to the first access point, wherein the alarm is not initiated based on the second tripping of the sensor being consistent with the authorization process and within the timeout period.

2. The method of claim 1, wherein the cover that covers the pipe that leads to a fuel tank is located below a second cover that covers a hole that includes the pipe that leads to the fuel tank.

3. The method of claim 1, wherein a second fuel access point is located within a cabinet that monitors the fuel delivered by a fuel pump.

4. The method of claim 3, wherein the second fuel access point is associated with a monitoring device that monitors fuel delivered by the fuel pump.

5. The method of claim 1, further comprising:
    identifying that the timeout period has expired when the sensor is tripped; and
    issuing a warning based on the identification that the timeout has expired when the sensor is tripped.

6. The method of claim 1, further comprising:
    identifying that a second sensor has been tripped;
    identifying that the tripping of the second sensor is not consistent with authorization data that control access to the fuel; and
    initiating the alarm based on the second sensor trip being unauthorized.

7. The method of claim 1, further comprising:
    identifying that the first indication is associated with a particular fuel tank.

8. The method of claim 1, further comprising:
    setting a first authorization status associated with accessing the first fuel access point via the cover attached to and that seals the pipe when:
        access to the first fuel access point is authorized, and
        access to a second fuel access point is controlled based on a second authorization status associated with a second sensor;
    identifying that the second sensor has tripped; and
    initiating an alarm based on the second authorization status and the tripping of the second sensor.

9. A non-transitory computer-readable storage medium having embodied thereon a program executable by a processor for implementing a method for controlling access to fuel, the method comprising:
    receiving a first indication that a sensor of a first fuel access point has been tripped, wherein the sensor of the first fuel access point monitors a cover that attaches to and seals a pipe;
    identifying that access to the first fuel access point is unauthorized;
    initiating an alarm based on the identification that the access to the first fuel access point is unauthorized;
    receiving authorization information associated with accessing the first fuel access point via the cover that attached to and that seals the pipe;
    setting a timeout period associated with the sensor based on the authorization information being consistent with an authorization process that allows access to the first fuel access point;
    receiving a second indication that the sensor of the first fuel access point has been tripped a second time; and
    identifying that the second tripping of the sensor is consistent with the authorization process that allows access to the first access point, wherein the alarm is not initiated based on the second tripping of the sensor being consistent with the authorization process and within the timeout period.

10. The non-transitory computer-readable storage medium of claim 9, wherein the cover that covers a pipe that leads to a fuel tank is located below a second cover that covers a hole that includes the pipe that leads to the fuel tank.

11. The non-transitory computer-readable storage medium of claim 9, wherein a second fuel access point is associated with a monitoring device that monitors the fuel delivered by a fuel pump.

12. The non-transitory computer-readable storage medium of claim 9, wherein:
    the second fuel access point is protected by a pulser device coupled to a fuel pump;
    a second sensor is disposed between the metering device and a surface onto which the metering device is mounted;
    the second sensor is in an un-tripped state when the second sensor is compressed; and
    the second sensor transitions to the tripped state when the metering device is removed from the surface.

13. The non-transitory computer-readable storage medium of claim 9, the program further executable to:
    identifying that the timeout period has expired when the sensor is tripped; and
    issuing a warning based on the identification that the timeout has expired when the sensor is tripped.

14. The non-transitory computer-readable storage medium of claim 13, the program further executable to:
    identify that a second sensor has been tripped;
    identify that the tripping of the second sensor is not consistent with authorization data that controls access to the fuel; and
    initiate the alarm based on the second sensor trip being unauthorized.

15. The non-transitory computer-readable storage medium of claim 9, the program further executable to:
    identify that the first indication is associated with a particular fuel tank.

16. The non-transitory computer-readable storage medium of claim 9, the program further executable to:

set a first authorization status associated with accessing the first fuel access point via the cover attached to and that seals the pipe when:
- access to the first fuel access point is authorized; and
- access to a second fuel access point is controlled based on a second authorization status associated with a second sensor;

identify that the second sensor has been tripped; and initiate an alarm based on the second authorization status and the tripping of the second sensor.

17. A system for controlling access to fuel, the system comprising:
- a first sensor of a first fuel access point;
- a computer that:
  - receives first indication that the first sensor of the first fuel access point has been tripped, wherein the first sensor of the first fuel access point monitors a cover that attaches to and seals a pipe;
  - identifies that access to the first fuel access point is unauthorized; and
  - initiates an alarm based on the identification that the access to the fuel access point is unauthorized;
  - receives authorization information associated with accessing the first fuel access point via the cover that attached to and that seals the pipe;
  - setting a timeout period associated with the first sensor based on the authorization information being consistent with an authorization process that allows access to the first fuel access point;
  - receiving a second indication that the first sensor of the first fuel access point has been tripped a second time; and
  - identifying that the second tripping of the first sensor is consistent with the authorization process that allows access to the first access point, wherein the alarm is not initiated based on the second tripping of the first sensor being consistent with the authorization process and within the timeout period.

18. The system of claim 17, wherein the cover that covers the pipe that leads to a fuel tank is located below a second cover that covers a hole that includes the pipe that leads to the fuel tank.

19. The system of claim 17, further comprising:
- a metering device that monitors pumping of the fuel;
- a second sensor disposed between the metering device and a surface onto which the metering device is mounted, wherein the second sensor is in an un-tripped state when the second sensor is compressed and the second sensor transitions to the tripped state when the metering device is removed from the surface.

20. The system of claim 17, further comprising one or more additional sensors each sensing access to an additional fuel access point.

* * * * *